UNITED STATES PATENT OFFICE.

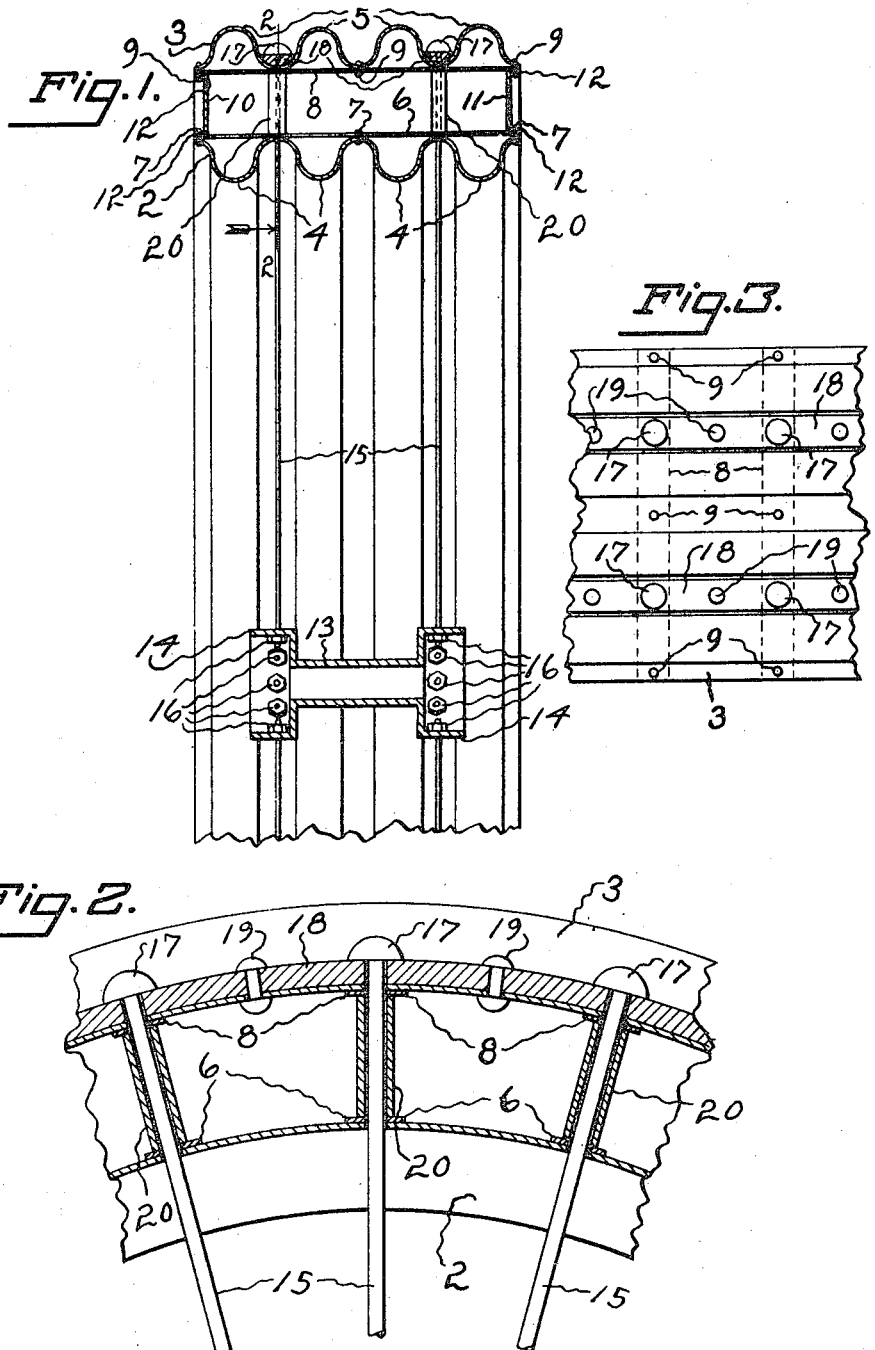

RICHARD L. SAUNDERS, OF HARTFORD, CONNECTICUT.

WHEEL.

1,311,468.      Specification of Letters Patent.      Patented July 29, 1919.

Application filed May 13, 1918. Serial No. 234,054.

*To all whom it may concern:*

Be it known that I, RICHARD L. SAUNDERS, a citizen of the United States, residing at Hartford, in the county of Hartford and State of Connecticut, have invented certain new and useful Improvements in Wheels, of which the following is a specification.

This invention relates to wheels. While a wheel involving the invention is capable of general use, it is, however, of particular advantage when associated with a wagon, truck, automobile and other vehicles intended to traverse heavy or muddy roads or fields. I provide a wheel which is susceptible of easy, ready and inexpensive manufacture and which possesses a great amount of strength and adequate tractive ability.

In the drawings accompanying and forming part of the present specification, I have shown in detail one convenient form of embodiment of the invention which to enable those skilled in the art to practise the same will be set forth fully in the following description. I do not necessarily restrict myself to this particular showing; I may depart therefrom in several respects within the scope of the invention defined by the claims following said description.

Referring to said drawings:

Figure 1 is a vertical section of the upper portion of a wheel involving the invention.

Fig. 2 is a transverse section on the line 2—2 of Fig. 1, and on a slightly larger scale.

Fig. 3 is a fragmentary detail in top plan.

Like characters refer to like parts throughout the several views.

The wheel involves in its structure what might be considered a felly section and a tire section, and parts such as meet my conditions may within limits vary considerably, such for instance as those designated respectively in a general way by 2 and 3. While the material of which they are made may vary greatly, I prefer to use for the purpose sheet metal. Obviously both the felly section 2 and the tire section 3 are of circular form. What is more important, however, is the fact that they are circumferentially ribbed or corrugated, the corrugations of the felly section being denoted by 4, and those of the tire section by 5. The corrugations or the external ribs and intermediate grooves of both the felly section and the tire section are continuous throughout the respective parts in a circumferential direction. It is conceivable that both parts need not be corrugated or ribbed, although the maximum strength is present when they are. The ribs and grooves of the respective sections 2 and 3 are opposite or are in coincidence radially of the wheel and the two sections are spaced or separated to receive reinforcing means.

As shown the felly section is provided with strips 6 extending transversely thereof on its inner face. As shown the length of each strip is approximately equal to the width of the felly section. Said strips (constituting suitable stiffeners) are fitted against the felly section and are suitably united thereto as by rivets extending through the respective parts. Complemental to the strips are like stiffeners or strips as 8 both series being made of convenient stock such as sheet metal. The strips or stiffeners 8 fit closely against the inner face of the tire section 3 on the inner side thereof and are united thereto as by rivets 9 which make the respective rivets 7.

Within the felly and tire sections at their lateral portions are practically flat rings as 10 and 11, for instance of sheet metal, these rings acting in addition to strengthening the wheel to space the tire and felly sections from each other. Said rings are turned outward or are provided with marginal lips or flanges 12 which fit against the lateral inner portions of the felly section 2 and tire section 3 and which receive the outer groups of rivets 7 and 9 to which I have already referred. A felly portion constructed as already described possesses a high degree of rigidity and stability, and the remaining parts of the wheel may be of any suitable nature, for instance as now to be set forth: A hub as 13 meets my conditions, this hub being hollow to fit an axle and having terminal heads as 14 perforated to receive the inner ends of spokes as 15 which consist of rods or bars, for example of suitable metal, the inner ends of the bars or rods being threaded to receive nuts as 16. These spokes, rods or bars obviously extend through registering perforations in the felly section 2 and tire section 3 and as shown are provided at their outer ends with heads or enlargements 17 to fit two circumferential grooves or channels of the tire section 3. As shown, however, the heads do not bottom in said grooves or channels but extend through perforations or holes in rings or bands as 18 snugly fitting said grooves or channels, said rings being rigidly held in position in the proper grooves in some suitable way as by the rivets 19. While the rings 10 and 11 to which I have already referred will under ordinary circumstances prevent collapsing or buckling of the felly portion of the wheel, still I provide preferably additional reinforcing means to coöperate in this particular and as shown the same consist of sleeves 20 fitted between the strips 6 and 8 in snug manner, and through which the outer portions of the spokes 15 extend. These sleeves or tubes 20 effectually aid the bands 10 and 11 in preventing the relative approach of the felly and tire sections 2 and 3 respectively.

The invention claimed herein involves neither the hub nor the spokes, although there is it is believed, a feature of claimable novelty in the manner in which the spokes are associated with the tire and felly section. Spokes or equivalent means and a hub quite different from those already described, may be associated with the tire and felly sections.

What I claim is:

1. A wheel comprising a circumferentially corrugated metallic tire section, and rings rigidly fastened in the grooves of said tire section.

2. A tire section for a wheel, of metallic annular form, circumferentially corrugated, and a ring rigid with the tire section in the circumferential groove thereof.

3. A wheel comprising a circumferentially corrugated metallic tire section, a ring set in a groove of the tire section, and spokes extending through the ring and the tire section.

4. A circumferentially corrugated metallic tire section, a felly section associated therewith, a ring set in a groove of the tire section, spokes extending through the tire and the felly sections, and sleeves around the spokes between the felly and the tire sections.

5. A wheel comprising a circumferentially corrugated metallic tire section, and a ring fastened in the bottom of a groove of the tire section.

6. A wheel comprising a circumferentially corrugated metallic tire section, a ring set in the bottom of a groove of the tire section, the tire section and the ring having perforations, spokes extending through the perforations of the ring and the tire section, and provided with heads bearing against the ring.

7. A wheel comprising a tire section and a felly section, both circumferentially corrugated and of metal, annular members fitted between the tire section and the felly section, strips extending transversely of the tire section and the felly section between the same and respectively united thereto, and means for connecting the strips, the annular members and the felly and the tire sections.

8. A wheel comprising a circumferentially corrugated metallic tire section, a felly section surrounded by and spaced from the tire section and annular members set in the space between the tire section and the felly section and respectively connected therewith.

In testimony whereof I affix my signature in the presence of two witnesses.

RICHARD L. SAUNDERS.

Witnesses:
L. L. MARKEL,
HEATH SUTHERLAND.